W. H. TILLSON.
OVERSHOE ATTACHMENT.
APPLICATION FILED MAR. 1, 1917.
1,246,357.
Patented Nov. 13, 1917.
2 SHEETS—SHEET 1.
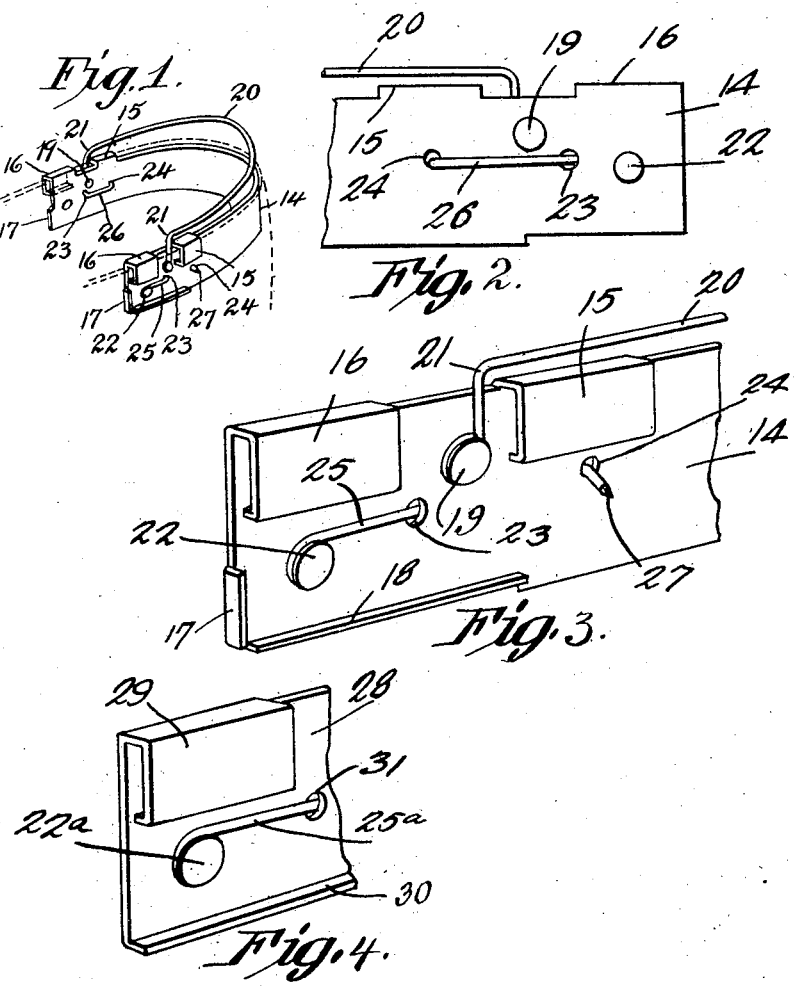
Witnesses
W. H. Tillson, Inventor
by C. A. Snow & Co.
Attorneys

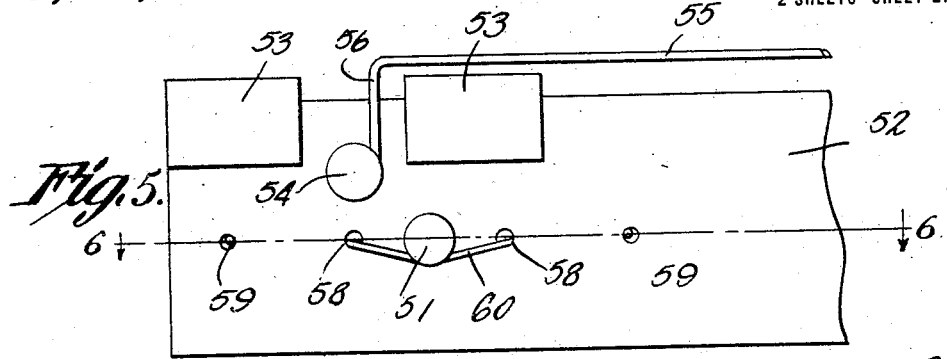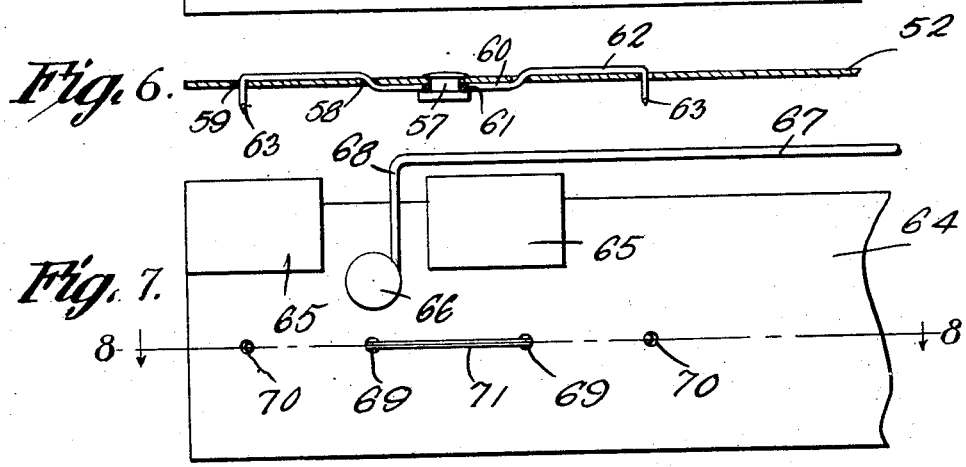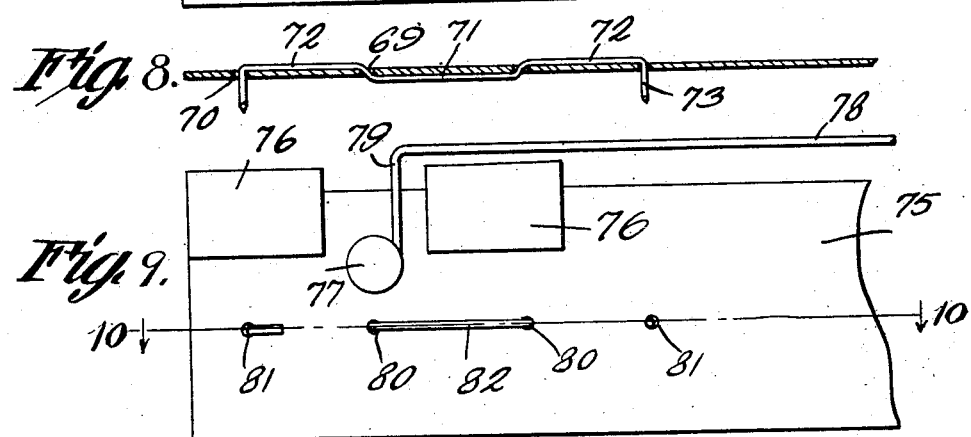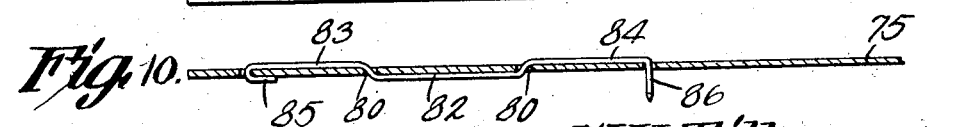

UNITED STATES PATENT OFFICE.

WILLIAM H. TILLSON, OF QUINCY, ILLINOIS.

OVERSHOE ATTACHMENT.

1,246,357.   Specification of Letters Patent.   Patented Nov. 13, 1917.

Application filed March 1, 1917. Serial No. 151,754.

*To all whom it may concern:*

Be it known that I, WILLIAM H. TILLSON, a citizen of the United States, residing at Quincy, in the county of Adams and State of Illinois, have invented a new and useful Overshoe Attachment, of which the following is a specification.

The device forming the subject matter of this application is an overshoe attachment, and one object of the invention is to provide novel means for causing the strip portion of the attachment to grip an overshoe or rubber.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in perspective, one form of the invention, assembled with an overshoe;

Fig. 2 is a fragmental elevation showing a modified form of the invention;

Fig. 3 is a fragmental perspective illustrating that form of the invention delineated in Fig. 2;

Fig. 4 is a fragmental perspective showing a further modification in the invention;

Fig. 5 is a fragmental side elevation showing a modified form of the invention;

Fig. 6 is a section on the line 6—6 of Fig. 5;

Fig. 7 is a fragmental side elevation showing a modified form of the invention;

Fig. 8 is a section on the line 8—8 of Fig. 7;

Fig. 9 is a fragmental side elevation showing a modified form of the invention;

Fig. 10 is a section on the line 10—10 of Fig. 9.

In the accompanying drawings, and referring to Figs. 1 and 2 both inclusive, there is shown a strip 14, preferably made of metal and ordinarily of such a construction that it may be bent to the U-shape shown in Fig. 1, so as to coöperate with the rear portion of an overshoe or rubber.

The strip 14 is provided with rear clips 15, forward clips 16, upstanding grip flanges 17 and horizontal flanges 18. The pivot elements are shown at 19 and the bail appears at 20, and is supported on the pivot elements 19, the bail being offset as shown at 21 to clear the clips.

Rivet or like securing elements 22 are mounted in the strip 14, the strip being provided with spaced openings 23 and 24. Holding devices 25 are shown, each holding device preferably being in the form of a length of wire, one end of which is secured to the rivet 22. The length of wire 25 extends along one face of the strip 14 and thence is prolonged through the opening 23, along the opposite face of the strip to form an arm 26, the arm 26 terminating in a prong 27 projecting through the opening 24. The arm 26 may be manipulated to thrust the prong 27 through the overshoe, and then the prong is clenched down on the overshoe.

In the form shown in Fig. 4, the strip appears at 28 and is provided with front and rear clips of the kind shown in Fig. 3, the front clip being designated by the reference character 29. The lower grip flange appears at 30. The openings of the kind shown at 23 and 24 in Fig. 3 are used, one of these openings appearing at 31. A holding device 25ª is used as before, and is carried by a rivet 22ª. This form of the invention is characterized by the fact that the upright grip flange 17 in Fig. 3 is omitted.

In Figs. 5 and 6, the strip is shown at 52 and is provided with clips 53 of the kind hereinbefore set forth. The strip 52 carries rivets 54 to which a bail 55 is pivoted. The bail 55 is offset as shown at 56, to clear one of the clips 53. At each end, the strip 52 carries a rivet 57. The strip 52 is provided with inner openings 58 and with outer openings 59. The numeral 60 denotes a holding device which may be a length of wire. The holding device 60 is engaged as shown at 61 around the rivet 57 and from the rivet is extended in opposite directions, along one face of the strip 52. Thence, the holding device is prolonged through the openings 58 to form arms 62 coacting with the opposite face of the strip 52. The arms 62 terminate in prongs 63 projecting through the openings 59 and adapted to be clenched on an overshoe.

In Figs. 7 and 8, the strip appears at 64 and is provided with clips 65. The strip 64 carries a rivet 66 to which a bail 67 is pivoted, the bail 67 being offset as shown at 68 to clear one of the clips 65. In the strip 64 at each end thereof are formed inner openings 69, and outer openings 70. The holding device is in the form of a length of wire, the intermediate portion 71 of which engages one face of the strip 64. The length of wire 71 thence is extended through the openings 69 to form arms 72 coacting with the opposite face of the strip 64, the arms 72 terminating in prongs 73 projecting through the outer openings 70. The prongs 73 are both adapted to be clenched down on an overshoe.

As shown in Figs. 9 and 10, the strip appears at 75 and is provided with clips 76 of the sort hereinbefore set forth. The strip 75 carries a rivet 77 to which is pivoted a bail 78, the bail 78 being offset at 79 to clear one of the clips 76. In the strip 75, inner openings 80 are formed, and the strip is also provided with outer openings 81. The holding device is in the form of a length of wire, the intermediate portion 82 of which engages one side of the strip 75. This length of wire is extended through the openings 80 to form arms 83 and 84 engaging the opposite face of the strip. The arm 83 terminates in an extension 85 prolonged through one of the openings 81 and clenched down on the strip 75. The arm 84 terminates in a prong 86 extending through the other of the openings 81. The prong 86 is adapted to be clenched down on the overshoe.

Having thus described the invention, what is claimed is:—

1. An overshoe attachment embodying a curved heel strip having an opening; a curved bail having its ends pivoted to the strip and operating above the strip; a yieldable arm extended along the strip, the arm terminating in a bendable prong extended through the opening; and means for securing the arm to the strip.

2. An overshoe attachment embodying a curved heel strip having an opening; a curved bail having its ends pivoted to the strip; and a holding member provided at one end with a bendable prong coöperating with the opening, parts of the holding member lying on opposite sides of the strip.

3. An overshoe attachment embodying a curved heel strip having inner and outer openings; a curved bail having its ends pivoted to the strip; and a holding member, a part of which lies on one side of the strip, the holding member being prolonged through the inner openings to form arms located on the opposite face of the strip, the arms terminating in extensions projecting through the outer openings.

4. An overshoe attachment embodying a curved heel strip having inner and outer openings; a curved bail having its ends pivoted to the strip; and a holding member, a part of which lies on one side of the strip, the holding member being prolonged through the inner openings to form arms located on the opposite face of the strip, the arms terminating in extensions projecting through the outer openings, one of the extensions being clenched down on the strip, and the other of the extensions projecting beyond the strip to form a bendable, overshoe engaging prong.

In testimony that I claim the foregoing as my own, I have hereto affixed my signature in the presence of two witnesses.

WILLIAM H. TILLSON.

Witnesses:
PORTIA BADGLEY,
HELEN KIEFER.

Copies of this patent may be obtained for five cents each, by addressing the "Commissioner of Patents, Washington, D. C."